(12) United States Patent
Paulsrud

(10) Patent No.: US 6,473,501 B1
(45) Date of Patent: Oct. 29, 2002

(54) CONCURRENT HUNT GROUP SEARCHING METHODS AND ARRANGEMENTS

(75) Inventor: Tomas Paulsrud, Sävedalen (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 0 days.

(21) Appl. No.: 09/332,352

(22) Filed: Jun. 11, 1999

(51) Int. Cl.$^7$ .................................................. H04M 1/00
(52) U.S. Cl. .................................. 379/157; 379/265.11
(58) Field of Search ........................... 379/157, 201.01, 379/211.02, 265.11, 265.01

(56) References Cited

U.S. PATENT DOCUMENTS

| | | | |
|---|---|---|---|
| 4,303,804 A | * 12/1981 | Johnson et al. | 379/92.02 X |
| 4,689,815 A | 8/1987 | Grewal et al. | 379/269 |
| 4,694,487 A | 9/1987 | Chang et al. | 379/269 |
| 4,964,155 A | 10/1990 | Pinard | 379/136 |
| 5,195,087 A | * 3/1993 | Bennett et al. | 379/202 X |
| 5,388,151 A | 2/1995 | Khalid et al. | 379/67 |
| 5,392,357 A | * 2/1995 | Bulfer et al. | 379/161 X |
| 5,440,623 A | 8/1995 | Moore et al. | 379/67 |
| 5,450,488 A | 9/1995 | Pugaczewski et al. | 379/67 |
| 5,517,560 A | * 5/1996 | Greenspan | 379/114 |
| 5,550,905 A | 8/1996 | Silverman | 379/142 |
| 5,557,667 A | * 9/1996 | Bruno et al. | 379/201 |
| 5,563,937 A | * 10/1996 | Bruno et al. | 379/207 X |
| 5,579,375 A | * 11/1996 | Ginter | 379/211 X |
| 5,590,187 A | * 12/1996 | Greenspan | 379/212 |
| 5,844,896 A | 12/1998 | Marks et al. | 370/385 |

FOREIGN PATENT DOCUMENTS

| | | |
|---|---|---|
| CA | 2108223 | 4/1995 |
| CA | 2108224 | 4/1995 |
| CA | 1336449 | 7/1995 |
| DE | 34 43 472 A1 | 6/1986 |
| DE | 44 30 343 A1 | 4/1995 |
| EP | 0 641 112 A2 | 3/1995 |
| GB | 2 282 937 A | 4/1995 |
| GB | 2 282 938 A | 4/1995 |

OTHER PUBLICATIONS

*Hybrid Switch Control Scheme for Fast Point–to–Point/Multicast/Hunt–Group Connection Setup*; IBM Technical Disclosure Bulletin, vol. 37, No. 11, Nov. 1994, (1994–11); pp. 641–645, XP002123528.

Standard Search Report for RS103457 US completed on Nov. 22, 1999, Dec. 08, 1999, EPO.

* cited by examiner

Primary Examiner—Creighton Smith
(74) Attorney, Agent, or Firm—Jenkens & Gilchrist, P.C.

(57) ABSTRACT

Methods and arrangements relating to voice hunt group searching techniques are provided for use in various telecommunication systems. The voice hunt group searching techniques allow for a plurality of incoming calls to concurrently attempt call set-ups to members within the voice hunt group. The voice hunt group is defined has having a plurality of members and an associated search order. Incoming calls to the voice hunt group are verified against an access list, and then allowed to attempt call set-ups with the next available member in the voice hunt group. Concurrent call set-ups are enabled through the use of an algorithm that significantly reduces queuing delays for subsequently received calls, and provides for concurrent call set-up processes.

26 Claims, 4 Drawing Sheets

CONCURRENT HUNT GROUP SEARCHING METHODS AND ARRANGEMENTS

FIELD OF THE INVENTION

The present invention relates to telecommunications and, more particularly, to methods and arrangements that allow concurrent hunt group search processes to occur with respect to a plurality of telecommunication terminals and/or associated users.

BACKGROUND OF THE INVENTION

Many conventional telephony systems and/or switches provide a feature known as a hunt group calling feature. Essentially, a hunt group calling feature allows users to call to a single telephone number and have their call (i.e., an incoming call) routed or directed to one of a plurality of telecommunication terminals assigned to a hunt group. A typical hunt group has associated with it, a particular search order that is followed in determining which of the telecommunication terminals within the group to contact first, and thereafter, in an attempt to complete the incoming call (i.e., conduct a call set-up). Information about the hunt group is usually stored as a list or in a like data structure within a programmable device, such as, for example, a memory associated with the telephony system or the switch.

Thus, for example, upon receiving an incoming call, the hunt group list is, usually, searched in a sequential manner until an idle telecommunication terminal within the hunt group is detected. The incoming call is then directed to this idle telecommunication terminal. If a user associated with this idle telecommunication terminal answers the incoming call, then the call set-up process is completed. If the call is not answered within a predefined period of time, e.g., after 2 rings, then the incoming call is "redirected" to the next idle telecommunication terminal defined by the ordering within the hunt group list. This redirection of the incoming call and associated call set-up process continues until either a user answers one of the telecommunication terminals, the system discontinues the incoming call (e.g., timed-out, etc.), or the calling party decides to discontinue the incoming call.

In certain systems, for example, the search order associated with the hunt group list is recursive, thereby allowing the calling party to continue this type of redirection/call set-up for an extended period of time.

In other hunt group searching processes the incoming call is, after a period of time, directed to an automated answering feature, such as, for example, a voice mail service associated with the hunt group. If all of the telecommunication terminals or lines in the hunt group are busy, then the incoming call is typically directed to an automated queuing service that places the incoming in a holding queue until such time as one of the telecommunication terminals becomes idle.

Hunt group related features, such as these, are well known. Indeed, most users have experienced many of these features from time to time when attempting to contact a business or similar organization. Hunt group features allow such entities to better serve the calling party by quickly handling incoming calls, and increase productivity and/or reduce costs by optimizing the use of limited telephony and personnel resources.

One notable drawback to such conventional hunt group features is that incoming calls are placed in a queue and handled one at a time. Thus, for example, if the hunt group is being actively searched in an attempt to complete a first incoming call, a subsequent second incoming call is typically either provided with a busy signal (e.g., busy tone or message) or made to wait for the first incoming call to be completed (i.e., placed in a queue).

For callers placed on hold, the delay can become unreasonable, especially when there are several preceding queued incoming calls, the hunt group is large, and/or the hunt group search process is time consuming.

For certain systems, this type of "bottleneck" is most profound when two or more incoming calls arrive at substantially the same time. In such a case, one or more of the callers will often receive a busy signal/message, rather than being queued.

Consequently, there is a need for improved hunt group related methods and arrangements for use in telecommunication systems that are capable of handling a plurality of incoming calls more efficiently, and preferably with fewer and/or shorter delays.

SUMMARY OF THE INVENTION

The present invention addresses the above exemplary needs and others, by providing hunt group searching methods and arrangements that allow telecommunication systems to concurrently service a plurality of incoming calls, thereby significantly reducing the potential for unwanted delays.

In accordance with certain aspects of the present invention, a hunt group feature is configured to allow concurrent processing of incoming calls by selectively controlling a switching mechanism, such as, for example, a switch matrix, a PBX switch, a router, a computer, or the like, to allow several incoming calls to actively search for available members (e.g., telecommunication terminals) within the hunt group by concurrently attempting call set-ups. Thus, the potential for excessive or extended queuing and/or other types of delays is significantly reduced because multiple incoming calls are handled at the same time.

As a consequence, unlike conventional systems employing serially queued hunt group searching techniques, subsequent callers are not as likely to receive a busy signal/message, be placed on hold for extended periods of time, wait for extended periods of time only to be redirected to voice mail, and/or otherwise experience excessive delays while the hunt group feature is handling a previous call.

In accordance with certain embodiments of the present invention, therefore, a method for use in a telephony system is provided. The method includes establishing a hunt group that includes a plurality of members and establishing a search order associated with the hunt group. The method further includes receiving at least a first call and a second call, each of which access the hunt group feature, and attempting to connect the first call with a first idle member within the hunt group in accordance with the search order, while concurrently attempting to connect the second call with a second idle member within the hunt group in accordance with the search order.

Thus, for example, with such a method both of the calls can be directed to contact (e.g., ring) different members in the search group at the same time. In certain embodiments, should the attempt to connect the first call be unsuccessful, then the method further includes automatically attempting to connect the first call to a subsequent next idle member within the hunt group in accordance with the search order. Similarly, should the attempt to connect the second call be unsuccessful, the method further includes automatically attempting to connect the second call to a subsequent next idle member within the hunt group, also in accordance with the search order. In this manner, for example, queuing related delays can be significantly reduced.

The above stated needs and others are also met by an arrangement for use in a telephony system, in accordance with certain embodiments of the present invention. The arrangement includes a switching mechanism and a controller. The switching mechanism, which is configured to receive a plurality of calls, is capable of being connected to a plurality of telecommunication terminals and selectively configured to direct each of the plurality of received calls to a different telecommunication terminal selected from among the plurality of telecommunication terminals. The controller is connected to the switching mechanism and is capable of establishing a hunt group, which includes a plurality of members, and an associated search order. The controller is also configured to operatively control the switching mechanism such that when a first call and a second call are received, the switching mechanism attempts to connect the first call with a first idle member within the hunt group in accordance with the search order, while also concurrently attempting to connect the second call with a second idle member within the hunt group also in accordance with the search order.

In certain further embodiments the above-mentioned arrangement also includes memory that is connected to the controller and configured to store information associated with at least the hunt group and the search order. In still other embodiments, the controller is capable of establishing an access list identifying members or other entities that are allowed to access such a hunt group feature.

In accordance with still further embodiments of the present invention, an application, for example, in the form of a computer-readable media, is provided for use within a telecommunications system. The application includes instructions that are suitable for causing a computer, switch or other like routing device to establish a hunt group, which includes a plurality of members, and a search order associated with the hunt group. The instructions, for example, can include software instructions that are suitable for use in a controller associated with the switch and/or embodied in hardware (e.g., logic circuits) associated with the switch. The instructions cause the switch to receive at least a first call and a second call, attempt to connect the first call with a first idle member within the hunt group in accordance with the search order, and concurrently attempt to connect the second call with a second idle member within the hunt group in accordance with the search order.

A telecommunication system is also provided, in accordance with still further embodiments of the present invention. The telecommunication system includes at least one switch and a plurality of telecommunication terminals connected to the switch. The switch is configured to establish a hunt group, which includes a plurality of members, and a search order associated with the hunt group. The switch is configured to receive at least a first call and a second call, and attempt to connect the first call with a first idle member within the hunt group in accordance with the search order, while concurrently attempting to connect the second call with a second idle member within the hunt group in accordance with the search order.

BRIEF DESCRIPTION OF THE DRAWINGS

A more complete understanding of the method and arrangements of the present invention may be had by reference to the following detailed description when taken in conjunction with the accompanying drawings wherein.

DETAILED DESCRIPTION OF A PREFERRED EMBODIMENT

Figure 1:
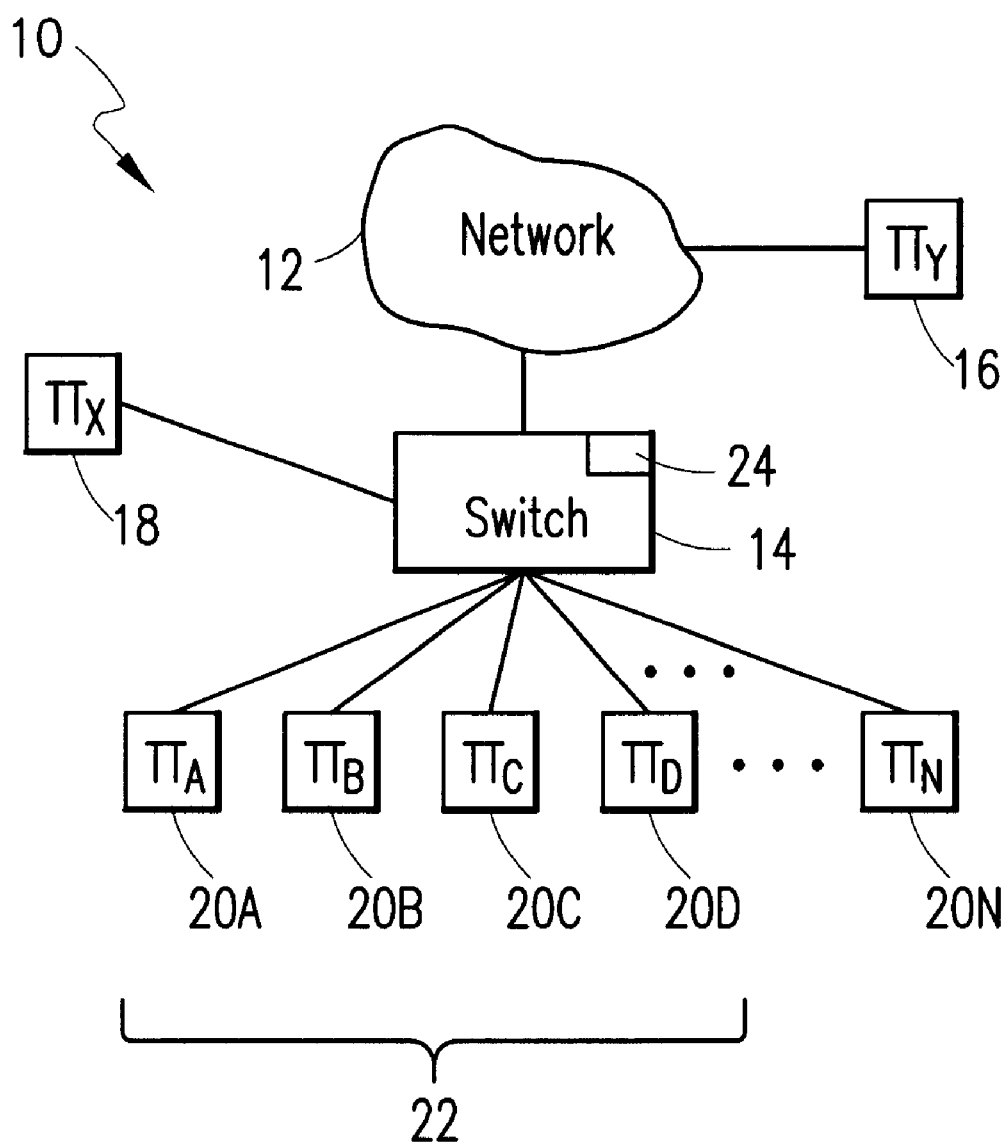
FIG. 1 is a block diagram depicting an exemplary telecommunications system suitable for incorporating and/or otherwise including the various hunt group methods and arrangements, in accordance with certain embodiments of the present invention.

FIG. 1 depicts an exemplary telecommunications system 10 that is configured to provide concurrent hunt group searching capabilities to a plurality of incoming calls. System 10 includes a network 12, such as, for example, a public switched telephone network (PSTN) or other like network that is configured to handle telephone calls between a plurality of telecommunication terminals.

A switch 14 is connected to network 12 and configured to provide telephony services to a plurality of telecommunication terminals, including at least one group of telecommunication terminals arranged as a hunt group.

Several telecommunication terminals are also shown in FIG. 1. For example, a telecommunication terminal ($TT_Y$) 16 is depicted as being connected to network 12 and a telecommunication terminal ($TT_X$) 18 is depicted as being connected to switch 14. Further, telecommunication terminals ($TT_{A-N}$) 20A–N are depicted as being connected to switch 14.

Exemplary telecommunication terminals can include conventional telephones, cellular telephones, computers, 15 modems, appliances, and/or other devices configured to communicate via network 12 and/or switch 14.

With this in mind, telecommunication terminals ($TT_{A-D}$) 20A–D are depicted as forming a hunt group 22 that is serviced by a hunt group feature application 24 within switch 14. Switch 14 and application 24 are configured to attempt to complete incoming calls (i.e., conduct call setups), for example from $TT_Y$ 16 and/or $TT_X$ 18, to at least one of the telecommunication terminals ($TT_{A-D}$)20A–D in hunt group 22.

Thus, an incoming call from $TT_Y$ 16 can be directed to $TT_A$ 20A by switch 14, assuming that $TT_A$ 20A is currently idle (i.e., available and/or not currently being used). If $TT_A$ 20A is a telephone, for example, then a ringing signal is provided by switch 14 that alerts a user or member associated with $TT_A$ 20A that an incoming call has arrived. If the member accepts the incoming call, for example by picking up a receiver on the telephone, then the incoming call has been completed. If the member does not accept the incoming call (e.g., within a timed period), then application 24 causes switch 14 to instead direct the incoming call to the next currently idle TT within hunt group 22.

Unlike previous hunt group techniques, which tend to handle one caller at a time, the various methods and arrangements of the present invention allow for concurrent call set-ups by a plurality of callers. For example, as described in more detail below, switch 14 and application 24 can be configured to concurrently allow a first incoming call from $TT_Y$ 16 and a second incoming call from $TT_X$ 18 to attempt call set-ups with different members or TTs associated with hunt group 22. Thus, if $TT_{A-D}$ 20A–D are each telephones, then a ringing signal can be provided by switch 14 to $TT_A$ 20A with respect to the first incoming call from $TT_Y$ 16, while at the same time a ringing signal is provided to $TT_B$ 20B associated with the second incoming call from $TT_X$ 18. In this manner, the second call is not forced to wait in a queue until the first call is completed. Moreover, by conducting a plurality of concurrent call set-ups to potential for queuing and/or related delays is significantly reduced.

Figure 2:
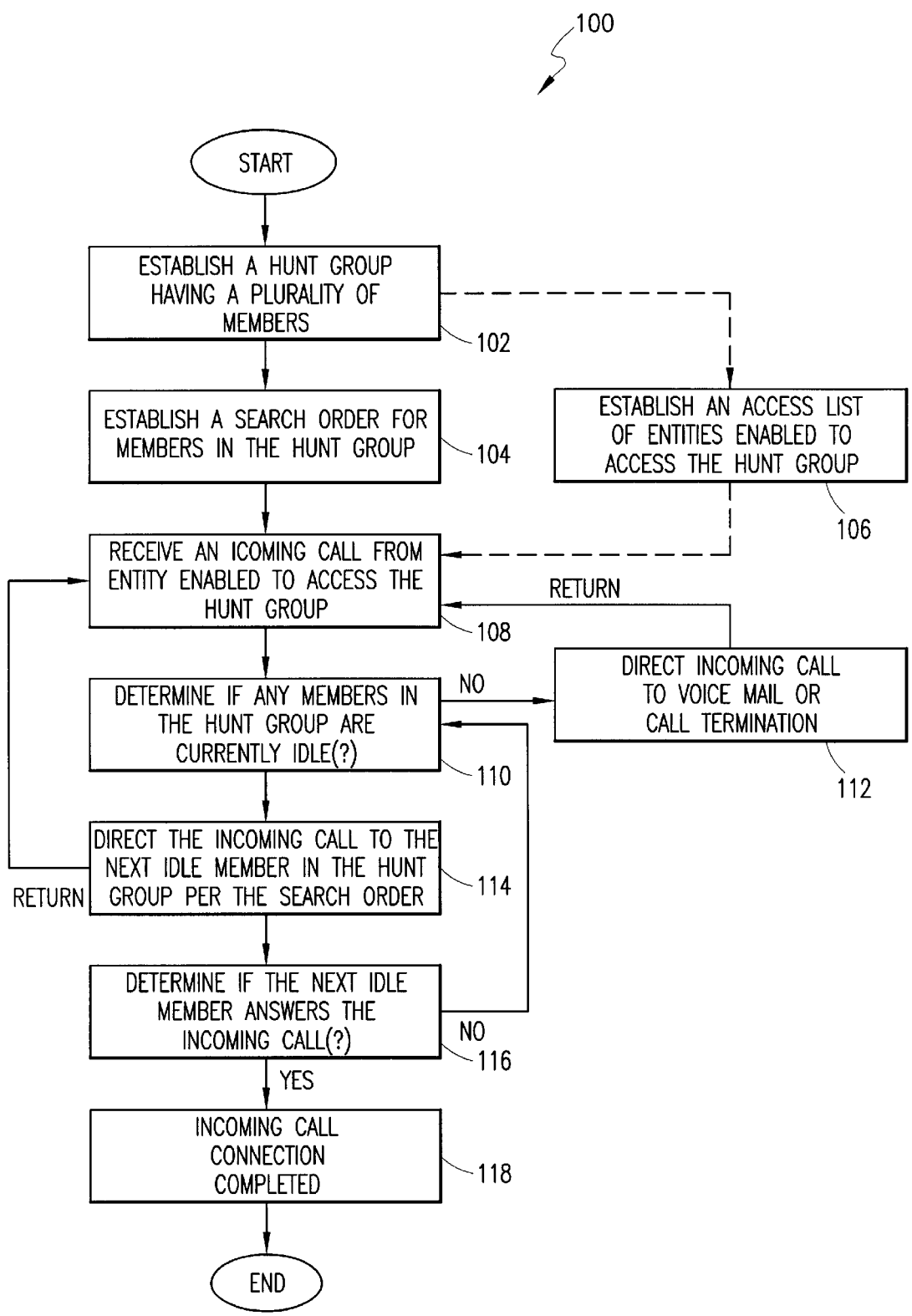
FIG. 2 is a flow-chart depicting a method for use in a telecommunications system, such as, depicted in FIG. 1, in accordance with certain embodiments of the present invention.

FIG. 2 is a flow-chart depicting an exemplary hunt group searching process 100, in accordance with certain embodiments of the present invention. Process 100, for example, can be incorporated or otherwise embodied in network 12, switch 14, and/or application 24 of FIG. 1, to concurrently receive and handle incoming calls to members in hunt group 22.

In step 102, hunt group 22 is established and includes a plurality of members. Step 102 can include, for example, generating a listing of TTs, lines, or other identifiers associated with the various members in hunt group 22. Step 102 can be static or dynamic depending on the needs of the system.

A search order for the members in hunt group 22 is established in step 104. The search order defines a preferred order in which incoming calls are to be directed to members in the hunt group. By way of example, the search order can define a sequential order, a non-sequential order, a dynamically allocated order, or the like. The search order can be uni-directional or multi-directional. Where applicable, the search order, can include recursive search patterns, wherein, for example, incoming calls may be directed to the same member more than one time if required.

In step 106, an access list is established that defines entities (e.g., users, members, telecommunication terminals, lines, etc.) are allowed to access or otherwise invoke a search of the hunt group 22. Step 106 can include, for example, establishing a list of identifiers or codes that can be analyzed to verify that an incoming call is from an entity enabled to access the hunt group features. The dashed lines connecting step 106 to steps 102 and 108 are meant to represent that step 106 is optional, because in certain configurations all incoming calls regardless of their source may be allowed to access the hunt group features.

Next, in step 108, an incoming call is received, for example, from a verified entity, in accord with the access list, if applicable. Verification can include, for example, comparing information related in the incoming call to information in the access list. By way of further example, Caller-ID relayed information can be used for this purpose. In step 108, subsequently received incoming calls can also placed in one or more temporary queues, should the need arise.

In step 110, it is determined if any of the members in hunt group 22 are currently idle. If no members are currently idle, then process 100 continues to step 112, wherein the incoming call is directed to a voice mail service or other service that acts to handle/terminate the incoming call.

Process 100 then returns to step 108 to receive the next incoming call.

If there is at least one idle member in hunt group 22, as determined in step 110, then in step 114 the incoming call is directed to the next idle member of hunt group 22, in accord with the search order established in step 104. At this point, process 100 also returns to step 108 to receive the next incoming call.

In step 116, it is determined if the next idle member has accepted the incoming call as directed in step 114. If the next idle member has not accepted the call, for example, within a defined period of time, then process 100 returns to steps 110 and 114 to search for the next idle member, should one exist. If it is determined that the next idle member answers the incoming call in step 116, then the call set-up is completed in step 118.

Figure 3:
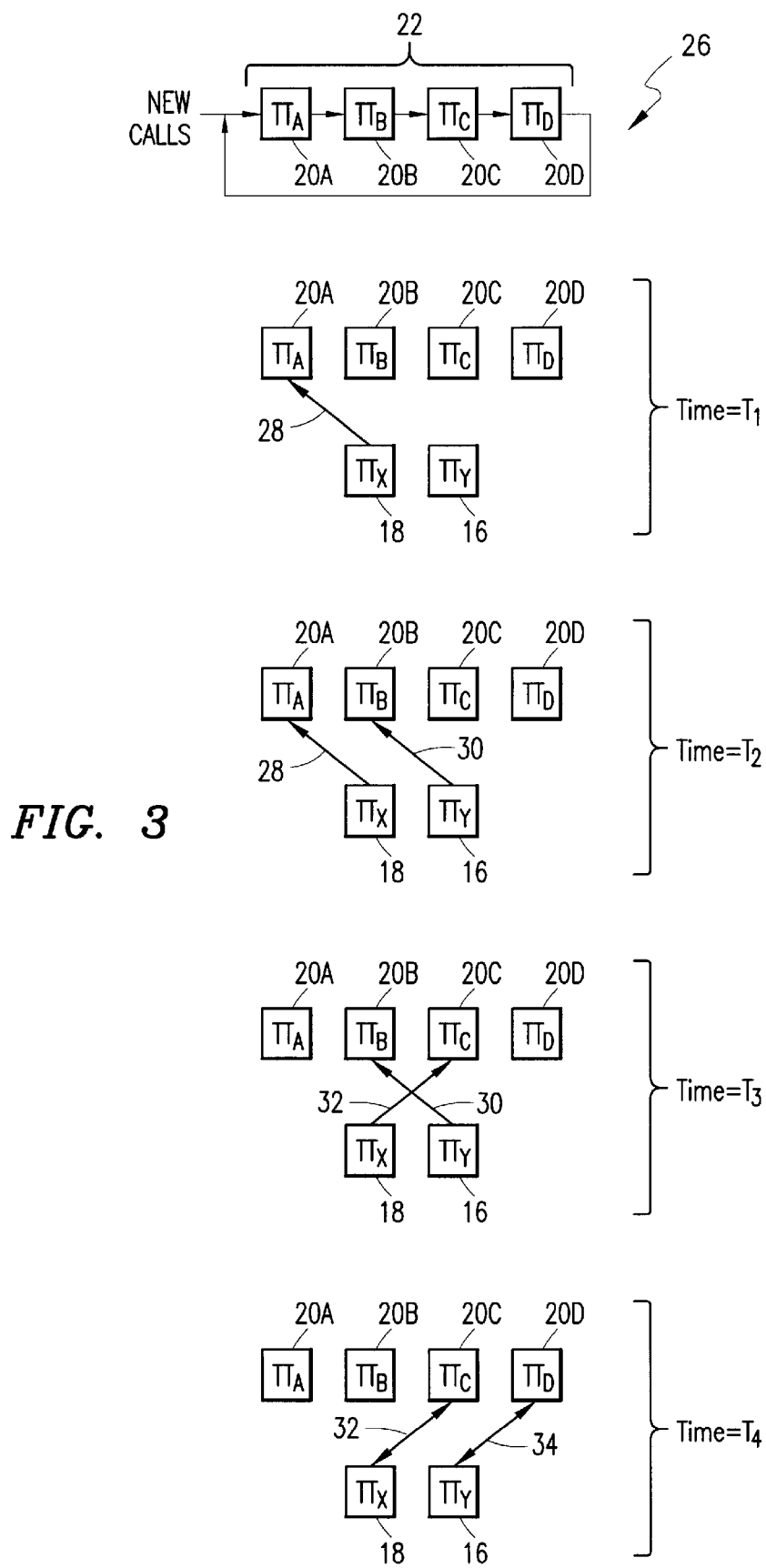
FIG. 3 is a block diagram depicting an exemplary search order and process associated with a method, such as depicted in FIG. 2, in accordance with certain embodiments of the present invention.

FIG. 3 includes various block diagrams that depict portions of an exemplary hunt group scenario, in accordance with process 100 of FIG. 2 and system 10 of FIG. 1.

At the top of FIG. 3, an exemplary search order 26 is graphically depicted for hunt group 22. In this example, search order 26 is sequential and recursive. As shown, an incoming call is first directed to $TT_A$ 20A, if it is determined that $TT_A$ 20A is currently idle. If $TT_A$ 20A is not currently idle, or does not accept the incoming call, then the incoming call is redirected to $TT_B$ 20B, assuming that it is currently idle. If $TT_B$ 20B is not currently idle or does not accept the incoming call, then the incoming call is redirected to $TT_C$ 20C (if currently idle). Similarly, should $TT_C$ 20C not be idle or not accept the incoming call, then the incoming call is redirected to $TT_D$ 20 (if currently idle). As can be seen, if $TT_D$ 20D is not idle or does not accept the incoming call, then search order 26, being recursive, starts the search over again with $TT_A$ 20A.

The remaining portion of FIG. 3 applies search order 26 to an exemplary sequence for two incoming calls, as depicted at different periods of time, namely $T_1$ through $T_4$. In this example, it is assumed that all of the members/terminals are currently idle and no calls are currently queued or connected. As such, during time $T_1$, an attempted call set-up 28 for a first incoming call from $TT_X$ 18 is directed to the next idle member, $TT_A$ 20A. During time $T_2$, while first call set-up 28 is still being attempted, another attempted call set-up 30 for a second incoming call from $TT_Y$ 16 is concurrently directed to the next idle member, $TT_B$ 20B.

During time $T_3$, attempted call set-up 28 for the first incoming call from $TT_X$ 18 is stopped, for example, because it timed out or idle member $TT_A$ 20A did not accept the call. Thus, in accordance with search order 26, another attempted call set-up 32 for the first incoming call from $TT_X$ 18 is directed to the next idle member, which happens to be $TT_C$ 20C since call set-up 30 renders $TT_B$ 20B unavailable or otherwise busy. As such, call set-ups 30 and 32 are concurrently being attempted during time $T_3$.

Similarly, during time $T_4$, attempted call set-up 30 for the second incoming call from $TT_Y$ 16 has been stopped, and in accordance with search order 26 another attempted call set-up 34 has been directed to the next idle member, which in this case happens to be $TT_D$ 20D. As such, call set-ups 32 and 34 are concurrently being attempted during time $T_4$.

The double-ended arrows depicting call set-ups 32 and 34, in FIG. 3, are further intended to illustrate completed call set-ups and resulting connections. Thus, at some point during time $T_4$, the member associated with $TT_C$ 20C accepts the first call from $TT_C$ 18, and likewise the member associated with $TT_D$ 20D accepts the second call from $TT_Y$ 16.

Figure 4:
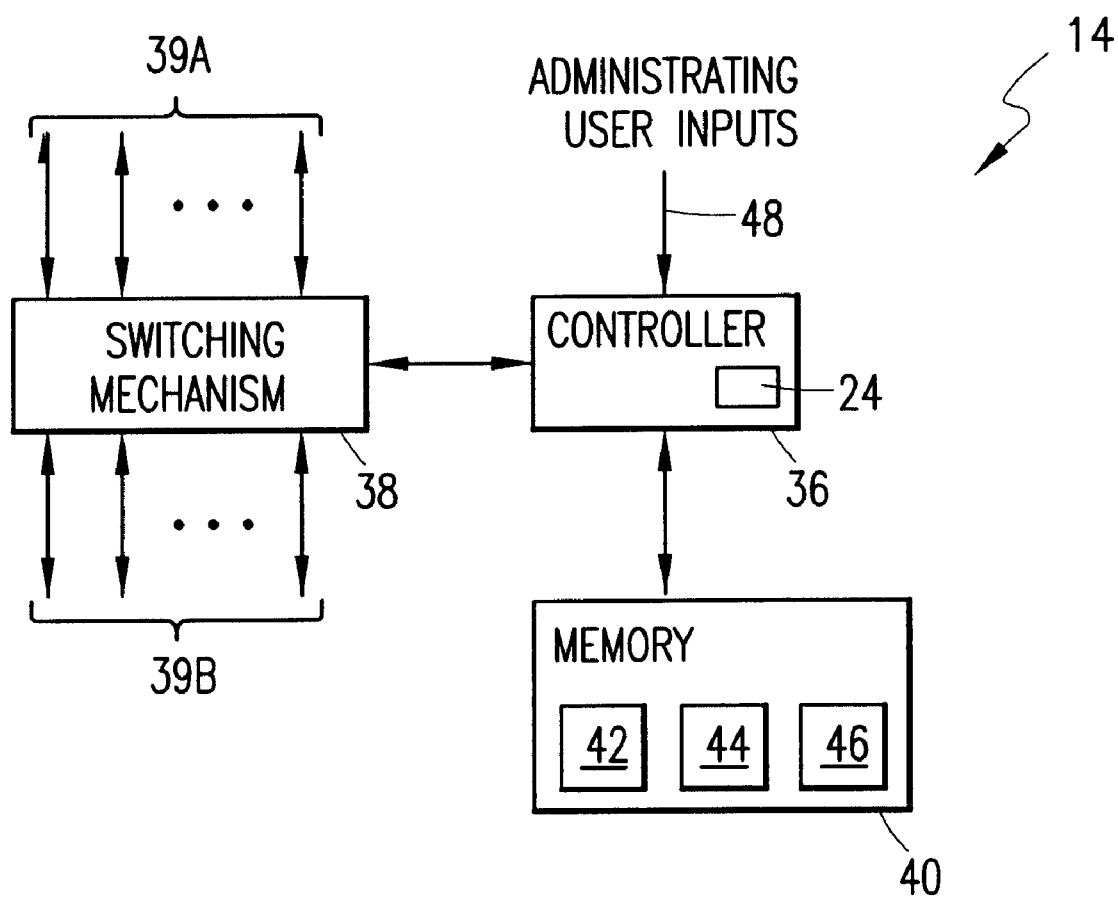
FIG. 4 is a block diagram depicting an exemplary switch arrangement for use in a telecommunications system, such as depicted in FIG. 1, in accordance with certain embodiments of the present invention.

FIG. 4 is a block diagram depicting an exemplary switch 14, in accordance with certain embodiments of the present invention. Switch 14 includes a controller 36, a switching mechanism 38 and a memory 40. Controller 36 is configured to control or otherwise conduct a hunt group search. To accomplish this task controller 36 can include one or more hardwired logic circuits and/or programmable processors that are responsive to instructions, for example, in accord with application 24. Thus, for example, in certain preferred embodiments, controller 36 includes a processor that is responsive to software instructions within application 24.

Memory 40 is connected to controller 36, and accessed thereby. Memory 40 can include solid-state memory and/or other types of data storage devices and/or media, which are capable of storing information relating to, and/or including, application 24. As depicted, memory 40 is graphically shown as including hunt group information 42, search order information 44, and access list information 46.

Controller 36 outputs one or more signals/indicators that operatively control switching mechanism 38. Switching mechanism 38 is configured to selectively connect one or more of lines 39A with one or more of lines 39B, in response to controller 36. Switching mechanism 38 can include, for example, a switch matrix, a crossbar switch, etc.

Controller 36 is further depicted as receiving administrative user inputs through input 48. This allows controller 36 to be programmed and/or receive inputs. Thus, for example, an administrative user can establish various hunt groups, search orders, access lists, and/or otherwise provide updates to application 24.

Although some preferred embodiments of the methods and arrangements of the present invention have been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for use in a telephony system having a plurality of members, each member being associated with at least one different identified telecommunication terminal, the method comprising:
    establishing a hunt group that includes at least a portion of the plurality of members;
    establishing a search order associated with the hunt group;
    receiving at least a first call and a second call, the first and second calls being configured to access at least a portion of the hunt group; and
    attempting to connect the first call with a first idle member within the hunt group in accordance with the search order, while concurrently attempting to connect the second call with a second idle member within the hunt group in accordance with the search order.

2. The method as recited in claim 1, wherein at least a portion of the search order defines a sequential search of at least a portion of the members within the hunt group.

3. The method as recited in claim 1, wherein at least a portion of the search order defines a recursive search of at least a portion of the members within the hunt group.

4. The method as recited in claim 1, wherein if the attempt to connect the first call is unsuccessful, the method further includes automatically attempting to connect the first call to a subsequent next idle member within the hunt group in accordance with the search order.

5. The method as recited in claim 1, wherein if the attempt to connect the second call is unsuccessful, the method further includes automatically attempting to connect the second call to a subsequent next idle member within the hunt group in accordance with the search order.

6. The method as recited in claim 1, further comprising establishing an access list that identifies a second plurality of members, each member being associated with at least one different identified telecommunication terminal, and wherein the step of receiving the first call and the second call further includes verifying that the first call and the second call are each from members identified in the access list.

7. The method as recited in claim 1, further comprising:
    receiving a plurality calls, including the first and a second calls, each of the plurality of calls being configured to access at least a portion of the hunt group; and
    concurrently attempting to connect each of the plurality of calls to different members within the hunt group in accordance with the search order.

8. The method as recited in claim 7, wherein the step of concurrently attempting to connect each of the plurality of calls to different members within the hunt group in accordance with the search order further includes, attempting to connect each of the plurality of calls to different members within the hunt group based on a time of receipt associated with each of the plurality of calls received.

9. An arrangement for use in a telephony system having a plurality of members, each member being associated with at least one different identified telecommunication terminal, the arrangement comprising:
    a switching mechanism configured to receive a plurality of calls, the switching mechanism being capable of being connected to a plurality of telecommunication terminals and selectively directing each of the plurality of received calls to a different telecommunication terminal selected from among the plurality of telecommunication terminals;
    a controller connected to the switching mechanism, the controller having the capability to establish a hunt group that includes at least a portion of the plurality of members, establish a search order associated with the hunt group, and operatively control the switching mechanism to receive at least a first call and a second call, the first and second calls being configured to access at least a portion of the hunt group, such that the switching mechanism attempts to connect the first call with a first idle member within the hunt group in accordance with the search order, while concurrently attempting to connect the second call with a second idle member within the hunt group in accordance with the search order.

10. The arrangement as recited in claim 9, further comprising memory connected to the controller and, configured to be accessed thereby, the memory being further configured to store information associated with at least the hunt group and the search order.

11. The arrangement as recited in claim 9, wherein at least a portion of the search order causes the controller to sequentially search at least a portion of the members within the hunt group.

12. The arrangement as recited in claim 9, wherein at least a portion of the search order causes the controller to recursively search at least a portion of the members within the hunt group.

13. The arrangement as recited in claim 9, wherein the controller further includes the capability to cause the switching mechanism to automatically attempt to connect the first call to a subsequent next idle member within the hunt group in accordance with the search order, if the attempt to connect the first call to the first idle member is unsuccessful.

14. The arrangement as recited in claim 9, wherein the controller further includes the capability to cause the switching mechanism to automatically attempt to connect the second call to a subsequent next idle member within the hunt group in accordance with the search order, if the attempt to connect the second call to the second idle member is unsuccessful.

15. The arrangement as recited in claim 10, wherein the controller is further capable of establishing access list that identifies a second plurality of members, each member being associated with a different identified telecommunication terminal, and verifying that the first call and the second call are each from members identified in the access list.

16. The arrangement as recited in claim 15, wherein the memory is further configured to store information associated with the access list.

17. The arrangement as recited in claim 9, wherein the switching mechanism is capable of receiving a plurality calls, including the first and a second calls, wherein each of the plurality of calls is configured to access at least a portion of the hunt group, and the controller is further capable of operatively causing the switching mechanism to concurrently attempt to connect each of the plurality of calls to different members within the hunt group in accordance with the search order.

18. The arrangement as recited in claim 17, wherein the controller is further capable of operatively causing the switching mechanism to attempt to connect each of the plurality of calls to different members within the hunt group based on a time of receipt associated with each of the plurality of calls received.

19. The arrangement as recited in claim 9, wherein the controller includes an application having a plurality of instructions that the controller is responsive thereto.

20. A computer-readable media for use within a telephony system having a plurality of members, each member being associated with at least one different identified telecommunication terminal, the computer-readable media comprising a plurality of instructions suitable for causing a switching mechanism to:

establish a hunt group that includes at least a portion of the plurality of members and a search order associated with the hunt group, receive at least a first call and a second call, the first and second calls being configured to access at least a portion of the hunt group, attempt to connect the first call with a first idle member within the hunt group in accordance with the search order, while concurrently attempting to connect the second call with a second idle member within the hunt group in accordance with the search order.

21. The computer-readable media as recited in claim 20, wherein at least a portion of the search order defines a sequential search of at least a portion of the members within the hunt group.

22. The computer-readable media as recited in claim 20, wherein at least a portion of the search order defines a recursive search of at least a portion of the members within the hunt group.

23. A telecommunications system having a plurality of members, each member being associated with at least one different identified telecommunication terminal, the telecommunications system comprising:

a plurality of telecommunication terminals; and at least one switching mechanism connected to the plurality of telecommunication terminals, and configured to:

receive a plurality of calls, selectively direct each of the plurality of received calls to a different telecommunication terminal selected from among the plurality of telecommunication terminals, establish a hunt group that includes at least a portion of the plurality of members, establish a search order associated with the hunt group, receive at least a first call and a second call, the first and second calls being configured to access at least a portion of the hunt group, and attempt to connect the first call with a first idle member within the hunt group in accordance with the search order, while concurrently attempting to connect the second call with a second idle member within the hunt group in accordance with the search order.

24. The telecommunication system as recited in claim 23, wherein at least a portion of the search order defines a sequential search of at least a portion of the members within the hunt group.

25. The telecommunication system as recited in claim 23, wherein at least a portion of the search order defines a recursive search of at least a portion of the members within the hunt group.

26. The telecommunication system as recited in claim 23, further comprising;

at least one network connected to the switching mechanism; and at least one telecommunication terminal connected to the network and configured to place at least the first call via the network.

\* \* \* \* \*

UNITED STATES PATENT AND TRADEMARK OFFICE
CERTIFICATE OF CORRECTION

PATENT NO. : 6,473,501 B1  Page 1 of 1
DATED : October 29, 2002
INVENTOR(S) : Tomas Paulsrud It is certified that error appears in the above-identified patent and that said Letters Patent is hereby corrected as shown below:

<u>Column 4,</u>
Lines 41-42, replace "computers, 15 modems," with -- computers, modems, --

<u>Column 6,</u>
Line 62, replace "TTc 18" with -- TTx 18 --

<u>Column 8,</u>
Line 48, replace "controller and, configured" with -- controller and configured --

<u>Column 9,</u>
Line 7, replace "establishing access list" with -- establishing an access list --

Signed and Sealed this

Fourth Day of March, 2003

JAMES E. ROGAN
*Director of the United States Patent and Trademark Office*